(12) United States Patent
Millet et al.

(10) Patent No.: US 8,086,233 B2
(45) Date of Patent: Dec. 27, 2011

(54) DETECTING CLONING OF NETWORK DEVICES

(75) Inventors: Mark Millet, Mountain View, CA (US); Anton Okmyanskiy, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 360 days.

(21) Appl. No.: 12/414,702

(22) Filed: Mar. 31, 2009

(65) Prior Publication Data
US 2010/0248720 A1    Sep. 30, 2010

(51) Int. Cl.
*H04W 4/00* (2009.01)
(52) U.S. Cl. ............ 455/435.1; 455/410; 455/422.1; 726/2; 726/4
(58) Field of Classification Search ............ None
See application file for complete search history.

(56) References Cited

U.S. PATENT DOCUMENTS

| | | | | |
|---|---|---|---|---|
| 5,467,382 A | * | 11/1995 | Schorman | 455/410 |
| 5,724,510 A | * | 3/1998 | Arndt et al. | 709/220 |
| 6,745,333 B1 | * | 6/2004 | Thomsen | 726/23 |
| 7,512,969 B2 | * | 3/2009 | Gould et al. | 726/4 |
| 2004/0123329 A1 | * | 6/2004 | Williams et al. | 725/111 |
| 2007/0208932 A1 | | 9/2007 | Millet et al. | |
| 2008/0126540 A1 | | 5/2008 | Zeng et al. | |
| 2010/0248720 A1 | * | 9/2010 | Millet et al. | 455/435.1 |

\* cited by examiner

*Primary Examiner* — Ajit Patel
(74) *Attorney, Agent, or Firm* — Edell, Shapiro & Finnan, LLC

(57) ABSTRACT

Techniques are provided to detect cloning of network device identity when network device is seeking registration for service in a network. A control server manages access to the network in which a plurality of network devices are configured to communicate and serve client devices. The network devices require registration with the service gateway in order to provide services. When network devices register with the service gateway, the service gateway performs local clone detection by looking for active registrations from devices with the same identity and by further communicating with the control server. The control server receives registration request messages associated with network devices seeking registration for service from gateway devices, wherein each registration request message includes data comprising an identifier of the network device that is seeking registration that is derived from data stored within a memory of the network device, and an identifier of the gateway device from which the registration request message is received. The control server evaluates the data contained in registration request messages with respect to stored data in order to determine whether a network device identity has been cloned when its registration request message contains an identifier that is already being used by at least one other network device.

28 Claims, 5 Drawing Sheets

DETECTING CLONING OF NETWORK DEVICES

TECHNICAL FIELD

The present disclosure relates to managing operations of network devices in a network which operate via a service gateway, such as femtocell wireless radio access point devices in wireless communication networks which operate via a femtocell gateway.

BACKGROUND

Femtocell access point devices are radio access point devices that are deployed at subscriber sites in order to improve coverage of mobile wireless communication service (e.g., cell phone, wireless messaging, etc.) and thereby offload the burden on the infrastructure of the mobile service provider. Femtocell access points are essentially cellular transceiver towers. Like cell towers, femtocell access points operate in a licensed spectrum that is subject to strict regulatory constraints on service providers.

When a femtocell device is activated for operation, it connects, via the Internet, to a gateway device in order to provide the service. A femtocell device is registered and enabled for service after it is authenticated based on identifier and other data associated with the femtocell device. Once authenticated and enabled for service, the femtocell device maintains a persistent connection to the gateway over which all cellular and voice traffic is channeled.

Femtocell devices are relatively low cost devices and are mass-produced with little or no hardware-based security, again for cost reasons. As a result, copies can be made of identifier data stored in an authorized femtocell device for a subscribed customer, and the copied data can then be written into another femtocell device, thereby creating what is called a clone femtocell device that contains an identifier of the authorized device. A clone device is a perfect replica of the original device and is normally indistinguishable from the original device without deploying special techniques. An undetected clone femtocell device can then operate in the wireless network under the subscription of the subscribed customer. Without suitable intelligence provided to detect a clone device, the presence of a clone device remains unknown to the wireless network service provider and the service provider suffers financial and network capacity losses due to unauthorized use of its licensed spectrum.

DESCRIPTION OF EXAMPLE EMBODIMENTS

Overview

Techniques are provided to detect cloning of network device identity that is seeking registration for service in a communication network. A control server manages access to a network in which a plurality of network devices are configured to communicate with service gateways through which network devices register for service. Service gateways process requests to register for service from the network device and maintains registration. Service gateways provide local logic for clone detection. The network devices may be configured to provide service directly to subscribers or via client devices in the network. The control server performs clone detection across service gateways. The control server receives registration request messages associated with network devices seeking registration for service from service gateway devices, wherein each registration request message includes data comprising an identifier of the network device that is seeking registration that is derived from data stored within a memory of the network device, and an identifier of the service gateway device from which the registration request message is received. The control server stores data associated with network devices that have registered for service, wherein the data indicates an identifier of a network device and one more identifiers of gateway devices through which a network device has been discovered and requested registration. The control server evaluates the data contained in registration request messages with respect to the stored data in order to determine whether or not registration with that network device identity already occurred. The service gateway and control server are able to detect cloned devices by identifying a network device with the same identity (identifier) already being used by at least one other network device.

Figure 1:
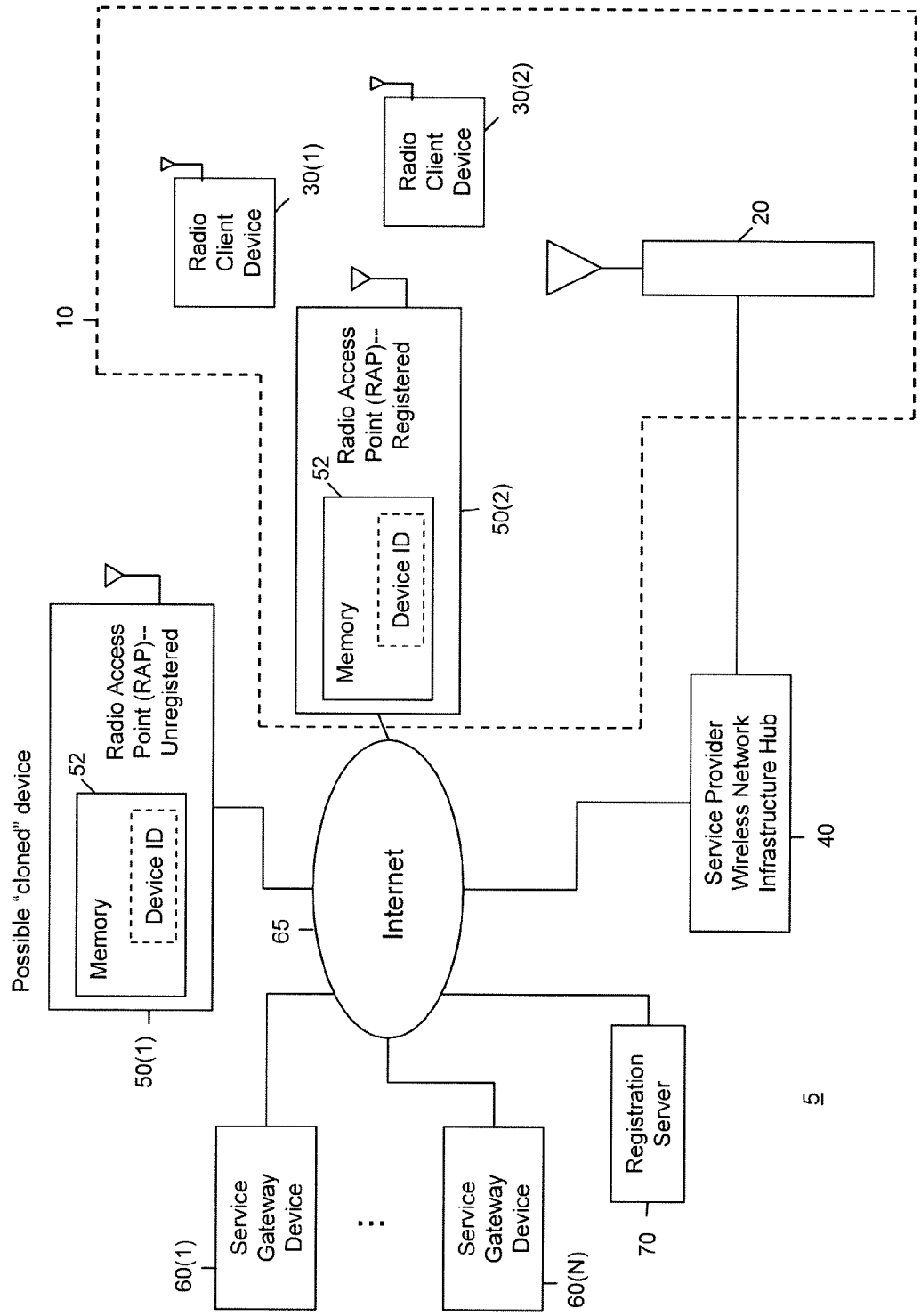
FIG. 1 is a block diagram illustrating a communication network environment in which cloning of an identity of a network device, such as radio access point device, is detected when another network device attempts to register for service in a wireless network using the same identity.

Referring first to FIG. 1, a communication system 5 is shown in which a wide area wireless communication network 10, e.g., a wireless cellular network, is deployed. The network 10 comprises a plurality of cellular radio transceiver "towers", one of which is shown at 20, to serve wireless network clients, e.g., referred to as radio client devices examples of which are shown at 30(1) and 30(2). The radio client devices may be mobile wireless handsets, laptop computer devices, or other devices capable of connecting to the wireless network 10. It should be understood that an actual wireless network 10 may have more than one cellular radio transceiver towers and more than two wireless radio client devices but only two of each are shown in FIG. 1 for simplicity. The cellular radio transceiver tower 20 connects to a service provider wireless network infrastructure hub 40 that in turn interfaces to any of a variety of telecommunication service networks, such as the public switched telephone network (PSTN).

In order to improve coverage of the wireless network 10 and to offload some servicing burden of the infrastructure of the wireless network 10, radio access point (RAP) devices are deployed. Two RAP devices 50(1) and 50(2) are shown as an example. Depending on the size, capacity and exact function of the RAP device, the RAP devices may be referred to as a "femtocell" access point devices, as a picocell access point devices, as a nanocell access point devices or with other trade names.

There are a plurality of service gateway devices 60(1)-60(N) that are configured to provide voice and data services to the RAP devices in the wireless network 10. Each service gateway device (simply referred to herein as a gateway device) may be assigned to serve RAP devices within a certain geographical region.

There is a registration server 70 that communicates with each of the gateway devices 60(1)-60(N). The registration server 70 performs detection of cloned RAP devices found in the entire deployment consisting of many multiple gateway devices. Communication between the RAP devices and the gateway devices 60(1)-60(N) is by way of the Internet 65, for example. Similarly, the registration server 70 communicates with the gateway devices 60(1)-60(N) via the Internet 65.

A service provider entity operates the wireless network 10 and in so doing charges subscription fees to customers for usage of the wireless network 10, including deployment and use of RAP devices. The service provider entity may operate the hub 40, gateway devices 60(1)-60(N) and the registration server 70.

When a RAP device is booted up for the first time, it is connected to the Internet 65 and sends a registration request message in order to be enabled for service. The registration request message is routed to an appropriate one of the plurality of gateway devices for processing and then may be forwarded on to the registration server 70. In order to be enabled for wireless service in the wireless network, the RAP device is first verified that it should be registered for service.

In this regard, data representing a RAP identifier (ID) is supplied in a registration request message sent by the RAP device. For example, as shown in FIG. 1, each of the RAP devices 50(1) and 50(2) each have a memory 52, such as a FLASH memory, in which a Device ID is stored. For example, the Device ID is an address formatted according to the Technical Report 069 standardized by the Broadband Forum. Other device identifier formats and types may be suitable. For example, a media access control (MAC) address or a serial number could be used as Device ID. Additionally, the device may contain an X.509 certificate authenticating the Device ID.

RAP devices act as cellular radio transceiver towers in that they operate in licensed spectrum just like the larger and fixed cellular radio transceiver tower 20. However, since RAP devices are by their nature movable from one location to another. Each RAP device also comprises other hardware and software (e.g., modem, radio frequency transmitter, radio frequency receiver, controller, etc.) associated with its wireless communication capabilities in the wireless network 10. These other RAP device components are not shown in FIG. 1 for simplicity.

It cannot be guaranteed that the Device ID in a RAP device is always a legitimate and authorized Device ID for a given RAP device. It is possible that a RAP device can be "hacked" such that the stored Device ID is copied from a first RAP device and written into a second RAP device. In the case that a Device ID is protected with an X.509 certificate, the certificate data itself can also be copied. The second RAP device is said to be a "clone" and should not be given authorization to operate in the wireless network 10. Such clone RAP devices cannot be distinguished from legitimate RAP devices by any software-based direct interrogation schemes. Techniques are provided herein to detect that a RAP device was cloned and in some cases identification of which of the plurality of devices with the same Device ID is legitimate and which one (or more) is a clone.

While the techniques and mechanism described herein are made with respect to a wireless network in which the RAP devices provide access, it is to be understood that they are also applicable to any number of types of network devices that provide continuous services via a service gateway in a wired network or a combination of wired and wireless networks. For example, these techniques may be applicable to any service where a network device needs to maintain a persistent connection or heartbeat with the gateway in order to provide some service. For example, a voice-over Internet Protocol (VoIP) device may maintain connectivity with or a heartbeat to a voice gateway device.

Figure 2:
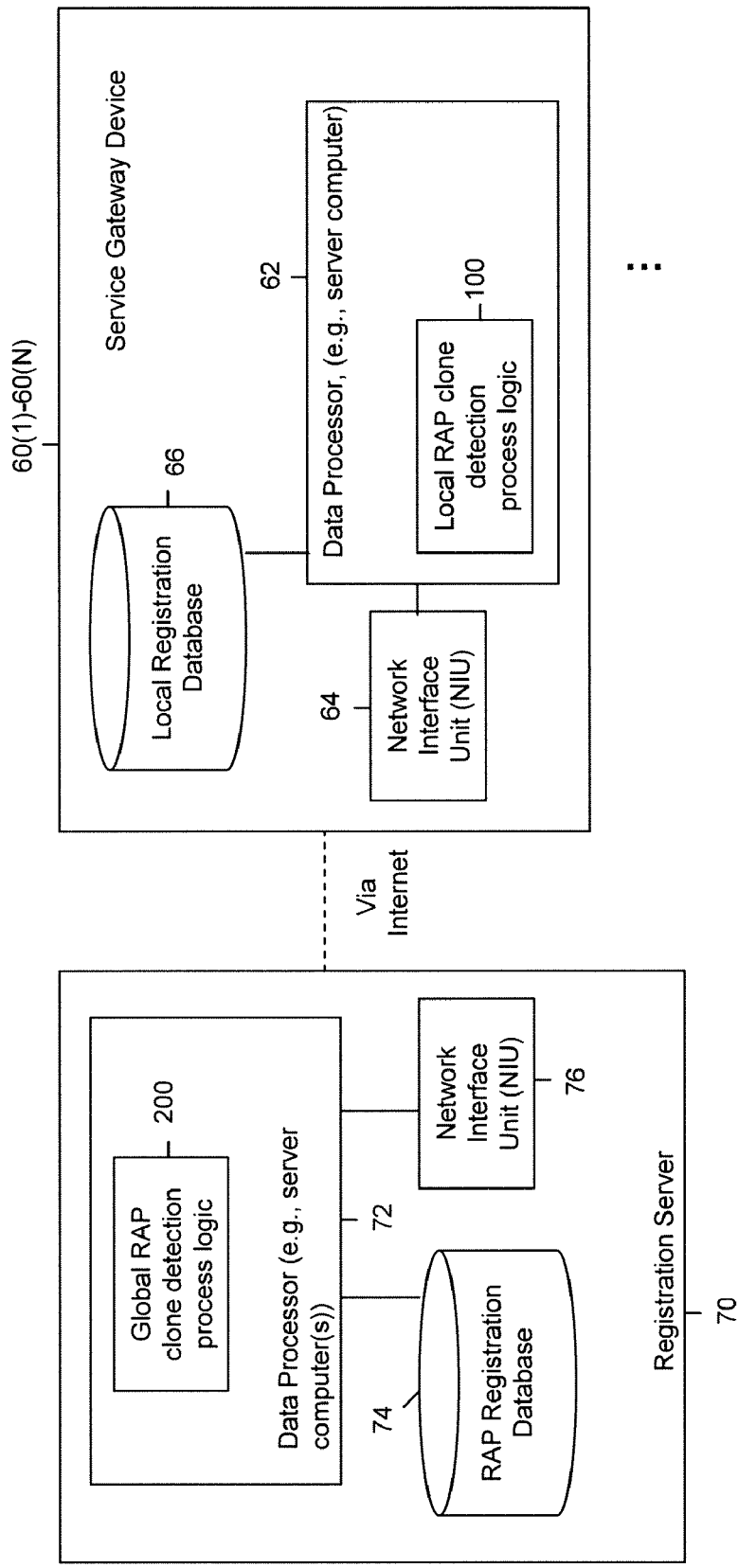
FIG. 2 is a block diagram showing an example of a gateway device and a registration server that are configured to detect cloning of network device identities.

Turning now to FIG. 2, one of the gateway devices 60(1)-60(N) and the registration server 70 are shown in more detail. FIG. 2 shows one gateway device with the understanding that the other gateway devices have similar configurations. The gateway device comprises a data processor 62 (e.g., a server or other computer) that executes a variety of processes, including local RAP clone detection process logic 100. The process logic 100 is designed to attempt to detect cloning of the RAP device identity at the individual gateway device level before the gateway device forwards a registration request to the registration server. The gateway device also comprises a network interface device (NIU) 64 that enables the gateway device to communicate over the Internet with the registration server 70 and RAP devices. For example, the NIU 64 is an Ethernet unit, e.g., an Ethernet card. A local registration database 66 is provided at a gateway device. The local registration database 66 stores data (e.g., device identifiers) associated with RAP devices that are registered for service through the corresponding gateway device, as well as other data associated with service of RAP devices at the local or gateway level.

The registration server 70 comprises a data processor 72 (e.g., a server computer) and a RAP registration database 74 that stores data associated with RAP devices that are registered or have attempted to register for service in the wireless network 10. The data processor 72 executes global RAP clone detection process logic 200. The global RAP clone detection process logic 200 operates across all gateway devices in response to registration request messages received from gateway devices in order to detect a clone RAP device. The registration server 70 also comprises a NIU 76 (e.g., an Ethernet unit) that enables it to communicate over the Internet with the gateway devices 60(1)-60(N).

The data processors 62 and 72 shown in FIG. 2 may take the form of any suitable controller device, such as a programmable microprocessor or microcontroller, etc., that executes instructions encoded in a processor readable memory medium. The memory medium referred to herein is understood to be contained within the blocks 62 and 72, and is where the instructions for the process logic 100 and 200, respectively, are stored or encoded. Alternatively, the functions of the data processors 62 and 72, including the process logic 100 and process logic 200, may be implemented by fixed or programmable digital logic gates, or any other suitable processing device, such as a digital signal processor, etc., configured to perform the functions of process logic 100 and 200 described herein. Thus, the process logic 100 and 200 may be embodied as logic encoded in one or more tangible media.

Figure 3:
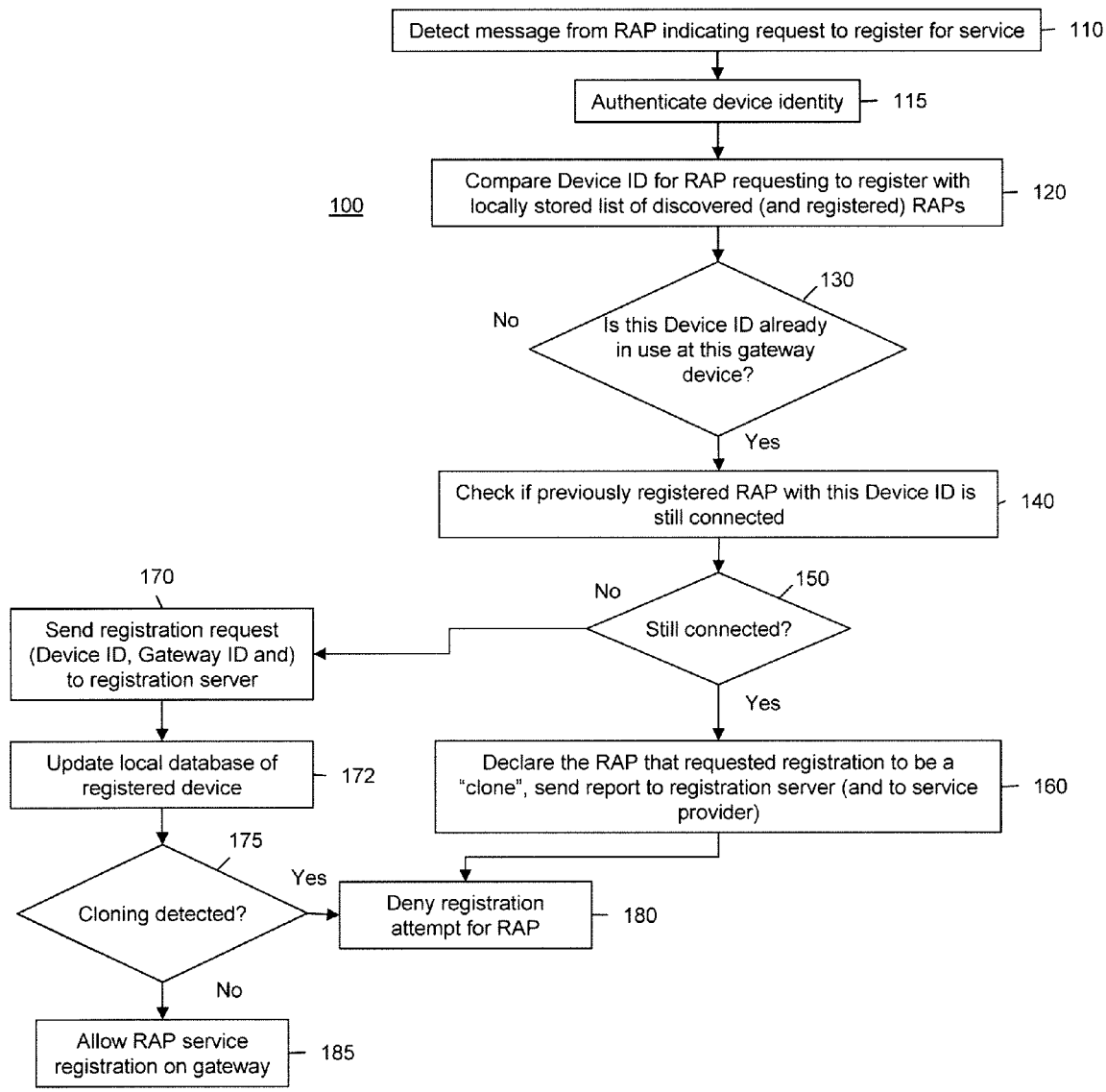
FIG. 3 is a flow chart depicting a process that is performed in a gateway device to detect cloning of a network device identity.

FIG. 3 illustrates a flow chart for the local RAP clone detection process logic 100 that is executed at individual gateway devices. Reference is also made to FIG. 1 in connection with the description of FIG. 3. When a RAP device is preparing to activate its service (for the first time or when rebooted) for operation in the wireless network 10 (to transmit and receive wireless signals with wireless client devices), it connects to a gateway device via the Internet 65. At 110, the gateway device detects a message from the RAP device indicating its request to register for service. The RAP device includes in its request its Device ID that is retrieved from its memory. At 115, the identity of the RAP device is authenticated. The identity may be authenticated using a secret code shared between the RAP device and the gateway, using a certificate or other authentication mechanism. The device identity authentication function at 115 provides a first level of defense by denying service to unauthorized RAP devices because it would require a clone of both the Device ID and the shared secret code or security certificate stored in a RAP device. In addition, at this point, the gateway device may compare the Device ID against a revocation list that contains a list of Device IDs for which registration should be automatically denied. This revocation list is described further hereinafter in connection with FIG. 4.

At 120, the gateway device compares the Device ID contained in the message received from the RAP device and compares it with a locally stored list of discovered RAP devices in the local registration database 66 (FIG. 2). The gateway device stores a list in the local registration database 66 of all RAP devices which are currently registered to receive service through this gateway.

At 130, the gateway device determines, based on the comparison at 120, whether the Device ID is already in use on this gateway, that is, whether it is in the locally stored list of registered RAP devices at this gateway device.

When at 130 it is determined that the Device ID is already registered for a RAP device previously discovered at the gateway device, then at 140, the gateway device checks if the previously registered RAP device with this Device ID is still connected and in use. There are many ways for the gateway to make this determination at 140, depending on specific technology used to provide the service. One technique is for the gateway device to wait for receipt of the next regular keep-alive message from the previously registered RAP device. If a new keep-alive message arrives, then the previous device can be considered to be still alive, e.g., connected or online, or otherwise still operating in the wireless network 10. Another technique is for the gateway device to send a message to the RAP device associated with that same previously registered Device ID. This message may be sent using a secure data path, such as a secure Internet Protocol (IP) tunnel previously established with the RAP device. The gateway then determines whether it receives a response from the RAP device to which it sent a message. When a reply message is received, this indicates that previously registered device is still connected and online. Otherwise, the previously registered RAP device with that Device ID is said to be offline or no longer connected.

At 150, using any of the techniques described above in connection with function 140, the gateway device determines whether the previously registered RAP device with that Device ID is still connected or online. When at 150 the previously registered RAP device is determined to be still connected, then the logic proceeds to 160, otherwise the logic proceeds to 170.

At 160, the gateway device generates data declaring that the RAP device identity has been cloned. The gateway device may send a report noting such to the registration server 70, which may in turn transmit a clone (or cloning) alert message to the service provider for the wireless network 10. In addition, other remedial actions described hereinafter may be taken.

On the other hand, at 170, a registration request message is sent to the registration server because at this point it is assumed that the RAP device seeking registration is not a clone. The registration request message contains the Device ID to be registered and a unique identifier for the gateway device. At 172, the gateway updates its local database for the Device ID that is to be registered. If it is subsequently determined, by the registration server, that the registration attempt is for a clone of the Device ID, then the gateway will be so notified by the registration server and this registration record removed from the local registration database by the gateway.

At 175, the gateway device awaits receipt of cloning detection response message from the registration server. It is possible that upon receiving the registration request message sent by the gateway device, that the registration server may determine that the RAP identity has been cloned based on data stored at the registration server's registration database. Thus, if at 175 the gateway receives a message that indicates that the RAP identity has been cloned, then at 180, the gateway denies registration of the RAP device and removes the registration record entered at 172 into the local registration database. Otherwise, at 185, the gateway allows registration for the RAP device and the RAP device can begin service in the wireless network. In another variation, clone detection results in generation of clone alerts and related messages but does not result in denying service to the second RAP until the service provider decides to put the Device ID into a revocation list or "locked" list, both of which are described hereinafter. In still another variation, registration for the second device attempting service with the same Device ID is denied and connection/service for the first device registered with that Device ID is terminated.

Figure 4:
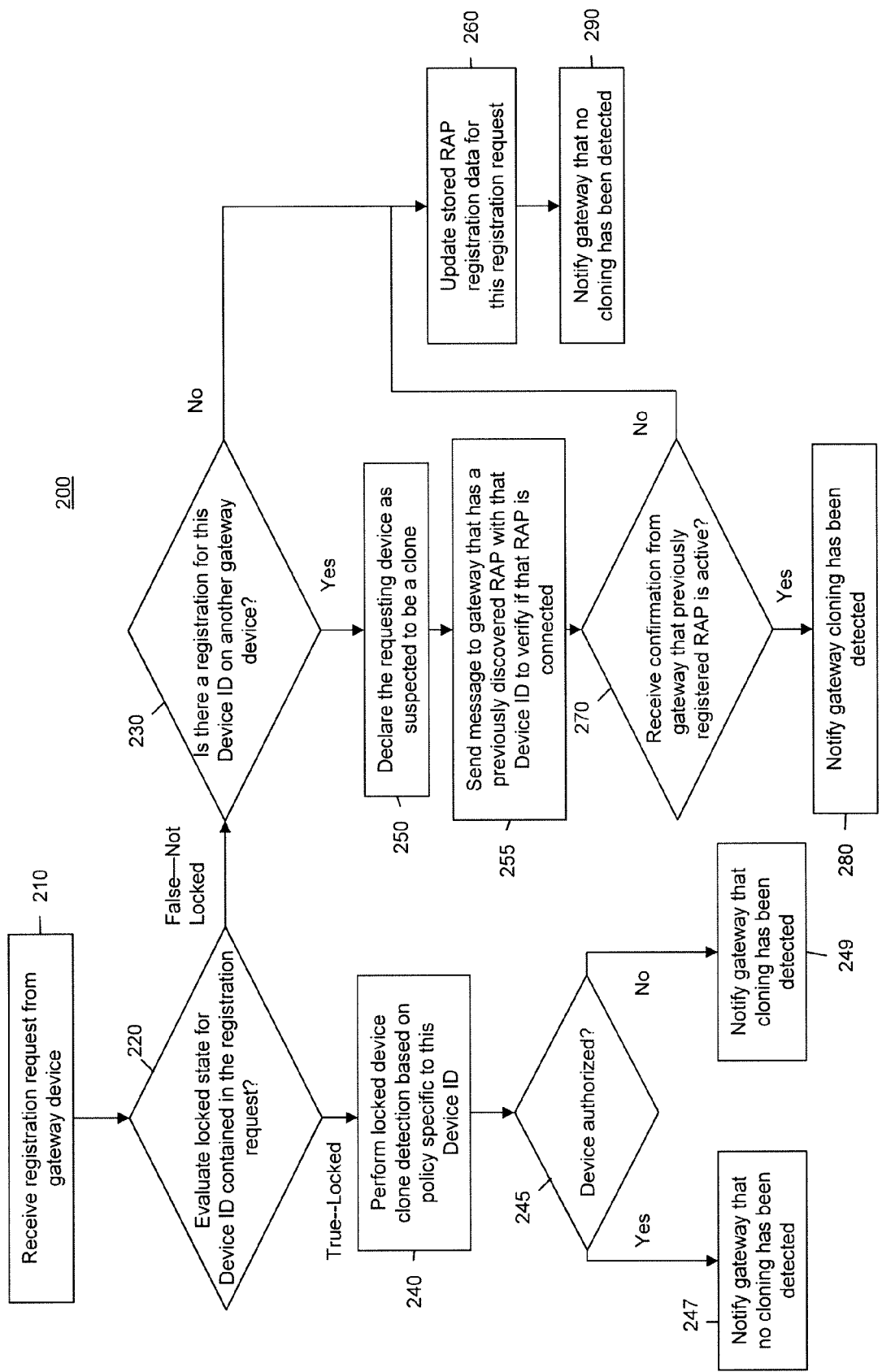
FIG. 4 is a flow chart depicting a process that is performed in the registration server to detect cloning of a network device identity across multiple gateway devices.

Referring now to FIG. 4, the global RAP clone detection process logic 200 is now described in more detail. Reference is also made to FIG. 1 in connection with the description of FIG. 4. During execution of the process logic 200, the registration server evaluates data stored in the RAP registration database 74. Table 1 below illustrates an example of some of the various data fields that are stored in the database 74.

TABLE 1

| Device ID | Current Registration(s) | Locked Status |
| --- | --- | --- |
| A3124384 | X431331 | No |
| AUD9432 | Y43433DE31, RT34104333 | No |
| YT3345 | Y43433DE31 | No |
| ... | | |
| CRE94592 | RT34104333 | Yes |

Table 1 shows several examples of the type of data stored in the RAP registration database 72. The first entry is a simple data record for Device ID "A3124384" which indicates that this Device ID has current registration from gateway ID X431331. The second entry in Table 1 shows an example of a Device ID that is detected at a first gateway device on and then at a second gateway device. The device may have two current registrations if the policy after clone detection allows for all devices with a cloned identity to continue to receive service until further administrative action (such as putting device ID on a revocation list or designating this device identity as locked for special processing).

There is a field in the table to indicate whether a Device ID is "locked". A Device ID may be locked so that when a registration request message containing a particular Device ID is received for processing, it is processed in a special manner that is configurable according to a desired policy so that specified criteria needs to be met, otherwise cloning has been declared and registration may be denied according to policy. These special processing rules can attempt to distinguish a clone from the real device based on some heuristics. This is useful because basic clone detection does not determine which device is legitimate and service provider may be reluctant to terminate services for all devices with cloned identity and thereby disrupt a legitimate subscriber's service.

For example, a service provider may lock a Device ID so that its registration request needs to pass through certain network routes in order to be enabled for service. The network routes may be identified as subnets using a trace route. In this manner, the service provider can, for example, lock a Device ID to a point of presence (POP) subnet for a particular city. In another example, a Device ID may be locked to a specific digital subscriber line (DSL) circuit ID that can be obtained in certain deployments from a DSL service provider. In yet another example, the service provider may require global positioning system (GPS) coordinates to be verified against stored GPS data in order to register a RAP device. In general, when a particular Device ID is locked or flagged for special processing when a registration request is received for the particular Device ID, there is also stored data describing the particular criteria (not shown in Table 1) with respect to which the evaluation of the registration request is to be performed so that data is generated indicating that a network device identity has been cloned in response to determining that the evaluation of the registration request for the particular identifier does not satisfy the particular criteria. Still another example of a special processing is to evaluate the GPS location of the RAP devices and compare it against target GPS location data for a device identity. If the RAP location is within a certain distance, it may be registered.

By using a locked flag or state, a service provider may come up with a policy that narrows the possibility for a cloned RAP device to get registered, making it more difficult or expensive to clone a RAP device than having to purchase a legitimate RAP device. The special processing logic for Device IDs in a locked state may be scripted according to customized service provider needs, with the goal that the service provider would only flag a few Device IDs for special processing for which clones were detected.

As shown in FIG. 4, the registration server stores, on an ongoing basis, RAP registration and other data in the RAP registration database. The RAP registration data comprises data that indicates an identifier of RAP devices and one or more identifiers of gateway devices through which corresponding RAP devices have been discovered and request registration. At 210, the registration server receives a registration request from a gateway device. At 220, the registration server begins a series of functions to evaluate the data (Device ID and gateway ID) in the registration request message with respect to data in the RAP registration database.

First, at 220, the Device ID is evaluated to determine whether it is flagged (locked) for special processing. When it is determined at 220 that the Device ID is not locked or flagged for special processing, then the logic continues at 230. On the other hand, when the Device ID is found in the registration database and is locked or flagged for special processing, then the process continues to 240. At 240, the registration server performs the special processing associated with the flagged Device ID that has been programmed or stored into registration data in advance by the service provider. Examples of special processing for flagged Device IDs are described above.

At 245, it is determined whether the RAP seeking registration should be authorized based on the outcome of the special processing at 240, e.g., particular criteria is satisfied. When it is determined that the RAP device should be registered, then the logic proceeds to 247 where the registration server sends a message to the gateway device from which the registration request message was received notifying the gateway device that no RAP device identity cloning has been detected. When it is determined at 245 that the RAP device should not be registered, then the logic proceeds to 249 where the registration server sends a message to the gateway device from which the registration request was received notifying the gateway device that RAP identity has been cloned. The gateway device responds to the notifications in the manner described above in connection with function 175 in FIG. 3.

At 230, the registration server determines whether the registration request message for the Device ID received at 210 is already registered on another gateway device. This function is performed by searching the database with the Device ID to determine whether there are any matches, and if so, whether the gateway ID in matching entries in the database is different from the gateway ID in the received registration request. When there is a matching entry in the database and that entry has a different gateway ID, then the process continues to 250. Otherwise, the process continues to 260 where the registration server stores the Device ID into a new entry of the database and continues with other registration and provisioning (service enabling) functions. After updating the registration database at 260, at 290 the registration server sends a message to the gateway device from which it received the registration request, notifying the gateway device that it is no cloning has been detected. The gateway device responds to the notification from the registration server in the manner described above in connection with function 175 in FIG. 3.

One with ordinary skill in the art understands that a RAP device may need to re-register with the service gateway from time to time due to re-booting and other related issues. As such, a RAP device may attempt to re-register at the same gateway device where it was previously registered. Also, it is possible that a RAP device may be moved to a different geographical location or due to load-balancing be connected to a different gateway device from the gateway device where it had been previously discovered.

To this end, at 250, an initial assessment is made at the registration server that the requesting RAP device is suspected to be a clone, and data is generated at the registration server to this effect. For example, a first RAP device 50(1) is discovered at a first gateway device 60(1) and uses the same Device ID as a second RAP device 50(2) that has already been registered and was discovered by a second gateway device 60(N). At 250, the registration server generates data indicating that the cloning of RAP device identity has been suspected when the identifier contained in the registration request message received at the registration server from the first gateway device 60(1) for the first RAP device 50(1) is the same as an identifier already registered to a second RAP device 50(2) that was discovered at the second gateway device 60(N).

However, thereafter, at 255, a message is sent to the gateway device (or to multiple gateway devices) that had previously discovered that device ID, e.g., the second gateway device 60(N), commanding that gateway device to verify whether or not the RAP with the same device identity is still active. The gateway device follows a process similar to that shown at 140 in FIG. 3 and described above in order to determine if device with the given identity is still registered and connected for service. At 270, the registration server receives a response from the gateway indicating whether or not the device with a given identity is currently registered and connected for service. When it is determined that the RAP device 50(1) does not have an active registration, then the process continues to 260 because it is assumed that it is the same RAP device that is attempting to register for service, but just at a different location such that it is being discovered from a different gateway device than the one that originally discovered it. Conversely, when at 270, the gateway device, e.g., gateway device 60(N), identifies that a RAP with the target identity has an active registration, then at 280, the registration server knows that device identity has been cloned and sends a message to the gateway device from which the registration request message was received notifying it that RAP device identity cloning was detected. In addition, the registration server may invoke various reporting and follow up policies, examples of which are described hereinafter. The function 255 at the registration server will invoke functions at the gateway device that are similar to those at function 140 and 150 shown in FIG. 3.

The functions 250, 255, 270 and 280 illustrate one technique for handling a registration request received from a Device ID that is previously registered at a different gateway device. Another technique to resolve this is to follow a policy in which all RAPs with the cloned identity are denied access. Since it may not be possible to determined which device is legitimate and which one is a clone, one policy may be to disallow access to all devices with such identity. In this case, the registration attempt by the second device will be denied. In addition, the gateway servicing the previously registered device will be instructed to terminate the service to that device.

Yet another technique is to automatically add that Device ID to a revocation list that the registration server distributes to the gateway devices or to a security server that is accessible by the gateway devices. The registration server then notifies the gateway device that the RAP device identity has with a given Device ID was cloned (via notifications like those at 249 and 290) causing the gateway device deny registration to that RAP device. In addition, all other gateways which had recorded registrations for that RAP are also instructed to terminate registrations and service to the RAP with cloned identity. When and if the RAP device attempts against to re-register, then it will be denied by any one of the plurality of gateway devices at function 115 in FIG. 3 by reference to the revocation list.

Another technique is to let the cloned RAP device register and provide service for a limited period of time by sending notification messages to the gateway device like those in function 290. The registration server then can execute a reporting and follow up policy. For example, administrators may be notified of a cloned device identity and can then designate the Device ID as being locked because it was cloned. Subsequently, the registration server sends notifications to the gateway devices to cause RAP devices with the target identity to re-register. For example, the gateway can terminate the connection between itself and the RAP device. Then, when the RAP device attempts to re-register, the registration server will see that the Device ID is locked for special processing and perform authorization for access according to specific policy rules and data for that device.

Figure 5:
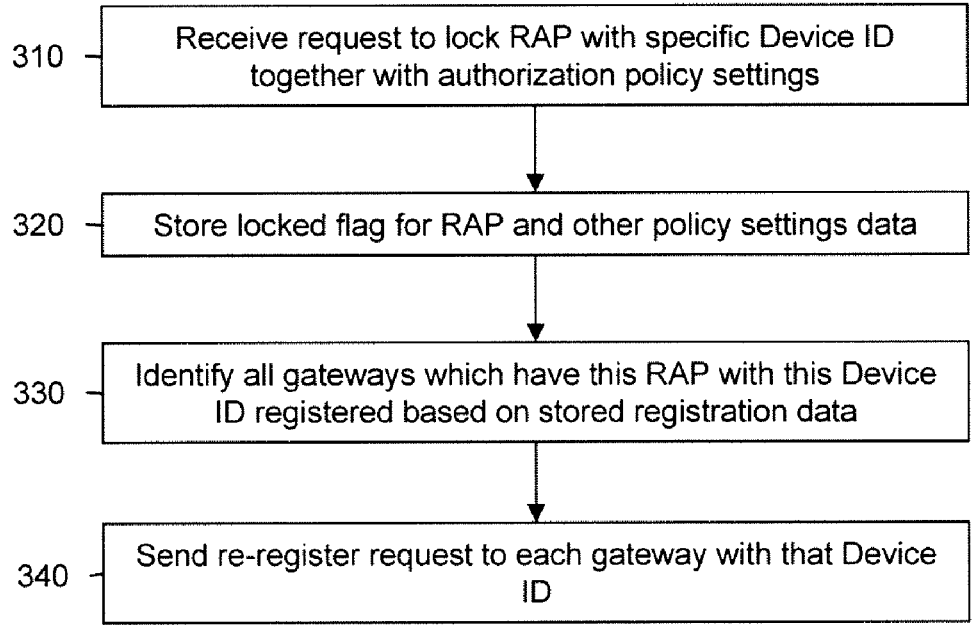
FIG. 5 is a flow chart depicting a process in the registration server for locking an identifier for a network device for special processing when evaluating for registration.
Figure 6:
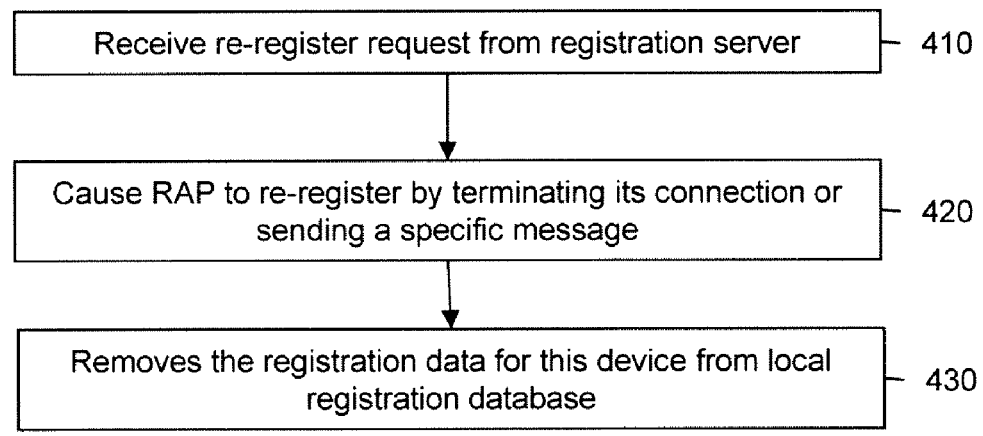
FIG. 6 is a flow chart depicting a process in a gateway device that coordinates with the process depicted by the flow chart of FIG. 5.

FIG. 5 illustrates a flow chart for additional process logic 300 at the registration server for setting a locked status or flag for a Device ID for special processing. FIG. 6 illustrates a flow chart for additional process logic 400 at a gateway device for cooperating with the process logic 300 at the registration server.

With reference first to FIG. 5, the process logic 300 begins at 310 where the registration server receives a request to set the locked status or flag a device for special processing for a specific Device ID along with specific authorization policy settings associated with the special processing. For example, as described above, a Device ID may be locked to a subnet "14.12.0.0/16". If a registration request for this Device ID comes to the registration server through a router with an IP address that is not in this subnet, the registration server will notify the gateway device that the RAP device using that Device ID is a clone and it will be denied registration. At 320, the registration server stores or sets the locked flag in the registration database 74 (FIG. 2) together with all of the relevant data associated with the special processing to be applied for that Device ID. At 330, the registration server identifies all of the gateway devices that have registered a RAP device with this Device ID based on registration data stored in the registration database 74. At 340, the registration server sends a re-register request message to each gateway device that had registered a RAP device with that Device ID. The gateways cause each RAP device to re-register, and in so doing, may restrict access of RAPs which do not satisfy the new policy rules (as described above at 240 in FIG. 4).

Referring now to FIG. 6, the process logic 400 is now described. At 410, the gateway device receives a re-register request message from the registration server for a particular Device ID. In response, at 420, the gateway device terminates its connection with the RAP device for that Device ID by sending a specifically configured message to the RAP device or otherwise causing the RAP device to re-register. The gateway then removes the registration data for this device from its local registration database at 430. When that RAP device attempts to re-register, the gateway device and registration server will process the registration request according to the process logic 100 and 200 described above in connection with FIGS. 3 and 4, where ultimately a RAP device seeking registration with a registration request that does not satisfy or meet the special criteria associated with the corresponding locked or flagged Device ID will not be allowed to register with the gateway.

When a gateway device loses connection with a RAP device, the RAP device is disconnected or the registration for a RAP device expires for some other fashion, the gateway device may be configured to remove the registration from its local database and to send an "unregister" message to the registration server that would remove the record for that RAP device from the registration database. The registration server responds to the unregister message from the gateway device and removes the particular Device ID record for that RAP device. It should be understood that the registration server may be configured to authenticate all requests or messages from gateway devices using any authentication protocol now known or hereinafter developed.

Furthermore, when a gateway device is shut down, not by way of a crash, but shut down for administrative purposes, the gateway device may be configured to send an unregister notification to the registration server for all RAP devices to which that gateway device was connected. A single gateway device may be connected to numerous RAP devices. Therefore, rather than sending individual unregister messages for each RAP device, the particular gateway device sends one "unregister all (gateway ID)" message to the registration server. The registration server then finds all registrations for the particular gateway device and removes them from the registration database. This same process may be followed at the gateway device and registration server when a gateway device starts up. The unregistration process is useful because the registration server does not need to send queries to gateways and RAP devices unnecessarily due to suspected clones. By removing registrations for a gateway that is shut down (either by a crash or administratively), the registration server will not delay registration of RAPs on another gateway by sending a query to this gateway device because all records in the registration database for RAP devices discovered by this gateway device would be removed, at least temporarily, while the gateway device is shut down.

There are a variety of remedial or follow up policy actions that may be taken when device cloning has been detected. One policy is to deny RAP device registration, but otherwise not prevent it from re-attempting registration. A second policy is to flag that Device ID for special processing whereby it is allowed or admitted limited registration, e.g., a pseudo-registration, but is not enabled for wireless service in the wireless network. Under this second policy example, the clone RAP device will not attempt to re-register. It will in fact believe that it is registered, but it will not be able to provide services via the gateway. As a result, the gateway device and the registration server will not get bogged down with numerous attempts by this RAP device at registering.

In another variation, the registration server may send a message causing the clone RAP device to connect to a different network (wired or wireless) for detailed monitoring and analysis of the clone RAP device. This latter solution may be useful if data is to be gathered about the clone RAP device so that it can be reported to the service provider who may want to take action against the individual who is attempting to register the clone RAP device.

Thus, the following summarizes the follow up policy/actions that may occur when cloning of RAP device identity was detected according to any of the techniques described herein. These actions may be performed alone or in combination in any desired sequence. A first action is for the registration server to send a clone alert message to a service provider for the wireless network. The clone alert message indicates/identifies the RAP device identity which was determined to be cloned, by virtue of a Device ID, gateway ID for the gateway device that discovered it, and a timestamp. Other information may be included in the clone alert message to further identify the RAP device. The registration server may send the clone alert message by any of a variety of means, including email message, text message, simple network management protocol (SNMP) message, and telecommunication control manager (TCM) message (used for voice network billing and provisioning messages) to a designated address of an administrator for the service provider entity associated with the wireless network.

A second action is to deny registration of the device with cloned identity so that it is not provisioned and enabled to provide wireless service to wireless client devices in the wireless network. In so doing, it is possible that the clone RAP device may still attempt to register again at some other point in time. Alternatively, any device with a cloned identity can be allowed access until further action by the service provider. In another alternative, it is possible to automatically put a device on revocation list and disconnect any existing device with this registration. This would deny any future registration attempts for devices with this identity at the authentication stage.

A third action is to pseudo-register the detected clone RAP device into a locked state and without sending provisioning data that enables the clone RAP device for providing wireless service to wireless client devices in the wireless network. This action may prevent subsequent attempts to register the RAP device since it will appear to be registered, although it will not in fact be able to provide the service.

Still another action is to send a message to the detected clone RAP device that configures it to connect to a particular network, such as a virtual local area network (VLAN), from which the clone RAP device may be monitored. Ultimately, through further monitoring of the detected clone RAP device on the VLAN where it cannot operate in the wireless network, it is possible to take even further remedial actions such as physically confiscating the detected clone RAP device.

The techniques described herein provide for real-time clone detection and subsequent policy enforcement. A service provider may choose the actions to take upon detection of a clone RAP device. Deployment of these techniques eliminates the monetary benefit from theft, cloning or tampering of RAP devices.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    at a control server that manages access to a network in which a plurality of network devices are configured to provide service to subscribers directly or via client devices in the network, wherein the network devices register for service in the network via one of a plurality of gateway devices, receiving registration request messages associated with network devices seeking registration for service from gateway devices, wherein each registration request message includes data comprising an identifier of the network device that is seeking registration that is derived from data stored within a memory of the network device, and an identifier of the gateway device from which the registration request message is received;
    at the control server, storing data associated with network devices that have registered for service, wherein the data indicates identifiers of network devices and identifiers of gateway devices through which network devices have been discovered and requested registration;
    at the control server, evaluating the data contained in registration request messages with respect to the stored data in order to determine whether a network device identity has been cloned when its registration request message contains an identifier already being used by at least one other network device; and
    generating data indicating that the network device identity is suspected of having been cloned based on the evaluating when the identifier contained in the registration request message received at the control server from a first gateway device for a first network device is the same as an identifier already registered for a second network device at a second gateway device.

2. The method of claim 1, wherein the network is a wireless network and each network device is a wireless radio access point device configured to wirelessly transmit signals to and receive signals from wireless radio client devices in the wireless network.

3. The method of claim 1, and further comprising sending a message to the second gateway device that causes the second gateway device to communicate with the second network device to verify that the second network device is still operating in the network, and further comprising generating data confirming that the network device identity has been cloned in response to receiving a message from the second gateway device indicating that the second network device is still operating in the network.

4. The method of claim 3, wherein in response to receiving a message from the second gateway device indicating that the second network device is not active, further comprising updating the stored data at the control server to indicate that the first network device is the same as the second network device and that it has moved and is now registered through the first gateway device.

5. The method of claim 1, and further comprising, at the control server, sending a clone alert message to a service provider for the network, wherein the clone alert message indicates that the network device identity has been cloned.

6. A method comprising:
at a control server that manages access to a network in which a plurality of network devices are configured to provide service to subscribers directly or via client devices in the network, wherein the network devices register for service in the network via one of a plurality of gateway devices, receiving registration request messages associated with network devices seeking registration for service from gateway devices, wherein each registration request message includes data comprising an identifier of the network device that is seeking registration that is derived from data stored within a memory of the network device, and an identifier of the gateway device from which the registration request message is received;
at the control server, storing data associated with network devices that have registered for service, wherein the data indicates identifiers of network devices and identifiers of gateway devices through which network devices have been discovered and requested registration; and
at the control server, evaluating the data contained in registration request messages with respect to the stored data in order to determine whether a network device identity has been cloned when its registration request message contains an identifier already being used by at least one other network device;
wherein storing further comprises storing in association with a particular identifier of a network device an indication that evaluating is to be performed with respect to particular criteria when a registration request message is received for the particular identifier together with data describing the particular criteria, and further comprising generating data indicating that a network device identity was cloned in response to determining that evaluating of a registration request message for the particular identifier does not satisfy the particular criteria.

7. A method comprising:
at a control server that manages access to a network in which a plurality of network devices are configured to provide service to subscribers directly or via client devices in the network, wherein the network devices register for service in the network via one of a plurality of gateway devices, receiving registration request messages associated with network devices seeking registration for service from gateway devices, wherein each registration request message includes data comprising an identifier of the network device that is seeking registration that is derived from data stored within a memory of the network device, and an identifier of the gateway device from which the registration request message is received;
at the control server, storing data associated with network devices that have registered for service, wherein the data indicates identifiers of network devices and identifiers of gateway devices through which network devices have been discovered and requested registration; and
at a gateway device that detects a network device requesting registration for service, comparing an identifier associated with the network device with stored identifiers of other network devices already registered for service in association with the gateway device, and denying registration for service of the network device when it is determined that its identifier is the same as one of the stored identifiers of other network devices already registered for service through the gateway device.

8. The method of claim 1, wherein when evaluating determines that a registration request message is received for the first network device using an identifier that is the same as an identifier for the second network device that is already registered for service, further comprising at the control server, sending a message to the first gateway device notifying the first gateway device that the network device identity has been cloned and to deny registration for service of the first network device.

9. The method of claim 1, wherein when evaluating determines that a registration request message is received for the first network device using an identifier that is the same as an identifier for the second network device that is already registered for service, further comprising at the control server, denying registration of the first network device for service and sending a message to the second gateway device instructing it to terminate the registration and service for the second network device.

10. The method of claim 1, wherein when evaluating determines that a registration request message is received for the first network device using an identifier that is the same as an identifier for the second network device that is already registered for service, further comprising at the control server, adding that identifier to a list of identifiers for which registration is to be denied, which list is made available to the plurality of gateway devices, sending a message to the gateway device that discovered the first network device to cause the gateway device to terminate connection with the first network device so that the first network device is forced to attempt to re-register, and further comprising at any one of the plurality of gateway devices, comparing the identifier against the list in response to a re-registration attempt from the first network device and denying registration to the first network device.

11. The method of claim 1, and further comprising at the control server, removing a record from the stored data for a particular identifier associated with a particular network device in response to receiving a message from a gateway device indicating that service for the particular network device is to disabled, and at the gateway device, removing a record from stored data in a local registration database associated with the gateway device for the particular identifier.

12. The method of claim 1, and further comprising at the control server, removing from the stored data a plurality of identifiers for network devices associated with a particular gateway device in response to receiving a message from the particular gateway device that it is shutting down.

13. A method comprising:
at a control server that manages access to a network in which a plurality of network devices are configured to provide service to subscribers directly or via client devices in the network, wherein the network devices register for service in the network via one of a plurality of gateway devices, receiving registration request messages associated with network devices seeking registration for service from gateway devices, wherein each registration request message includes data comprising an identifier of the network device that is seeking registration that is derived from data stored within a memory of the network device, and an identifier of the gateway device from which the registration request message is received;

at the control server, storing data associated with network devices that have registered for service, wherein the data indicates identifiers of network devices and identifiers of gateway devices through which network devices have been discovered and requested registration;

at the control server, evaluating the data contained in registration request messages with respect to the stored data in order to determine whether a network device identity has been cloned when its registration request message contains an identifier already being used by at least one other network device; and at the control server, storing in association with a particular identifier of a network device data indicating that registration processing is to be based on specific criteria when a registration request message is received that contains the particular identifier, identifying any gateway device that has registered a network device with the particular identifier, and sending a re-register request message to any gateway device that has registered a network device with the particular identifier.

14. The method of claim 13, and further comprising at a gateway device, receiving the re-register request message, in response to receiving the re-register request message, removing registration data from a local registration database associated with the gateway device, and causing the network device that registered with the particular identifier to disconnect from the gateway device and to re-register for service.

15. The method of claim 14, and further comprising at the control server, receiving from a gateway device a registration request message containing the particular identifier, and evaluating the registration request message with the particular identifier according the specific criteria to determine whether or not to register a network device seeking registration with the particular identifier.

16. An apparatus comprising:
a network interface unit that is configured to provide communications with a plurality of gateway devices that are configured to discover network devices that are capable of providing service to subscribers or client devices in a network; and
a controller that is configured to:
store data associated with network devices that have registered for service, wherein the data indicates an identifier of a network device and one more identifiers of gateway devices through which a network device has been discovered and requested registration; and
receive registration request messages associated with network devices seeking registration for service in the network, wherein each registration request message includes data comprising an identifier of the network device that is seeking registration that is derived from data stored within a memory of the network device, and an identifier of the gateway device from which the registration request message is received;
evaluate registration request messages associated with network devices seeking registration for service from gateway devices in order to determine whether a network device identity has been cloned when its registration request message contains an identifier already being used by at least one other network device; and
generate data indicating that a network device identity is suspected of having been cloned when the identifier contained in the registration request message received from a first gateway device for a first network device is the same as an identifier already registered to a second network device that was discovered at a second gateway device.

17. The apparatus of claim 16, wherein the controller is configured to store data associated with wireless radio access point devices that are configured to wirelessly transmit signals to and receive signals from wireless client devices in a wireless network.

18. The apparatus of claim 16, wherein the controller is further configured to send a message to the second gateway device that causes the second gateway device to communicate with the second network device in order to verify that the second network device is active, and to generate data confirming that the network device identity has been cloned in response to receiving a message from the second gateway device indicating that the second network device is active.

19. The apparatus of claim 16, wherein the controller is configured to store in association with a particular identifier of a network device an indication that it is to evaluate a registration request for the particular identifier with respect to particular criteria together with data describing the particular criteria, and the controller is further configured to generate data indicating that a network device identity has been cloned when the registration request for the particular identifier does not satisfy the particular criteria.

20. The apparatus of claim 16, wherein when the controller evaluates a registration request message for the first network device using an identifier that is the same as an identifier for a second network device that is already registered for service, the controller is configured to send a message to the first gateway device from which the registration request message is received for the first network device notifying the first gateway device that the network device identity has been cloned and to deny registration for service of the first network device.

21. One or more tangible computer readable storage media encoded with logic for execution and when executed operable to:
store data associated with network devices that have registered for service in a network comprised of a plurality of network devices that are configured to provide service to a subscriber or to client devices in the network, wherein the network devices communicate through one of a plurality of gateway devices in order to register for service in the network; and
receive registration request messages associated with network devices seeking registration for service in the network, wherein each registration request message includes data comprising an identifier of the network device that is seeking registration that is derived from data stored within a memory of the network device, and an identifier of the gateway device from which the registration request message is received;
evaluate registration request messages associated with network devices seeking registration for service received from gateway devices in order to determine whether a network device identity has been cloned when its registration request message contains an identifier already being used by at least one other network device; and
generate data indicating that a network device identity is suspected of having been cloned when the identifier contained in the registration request message received from a first gateway device for a first network device is the same as an identifier already registered to a second network device that was discovered at a second gateway device.

22. The one or more tangible computer readable storage media of claim 21, and further comprising logic operable to send a clone alert message to a service provider for the network, wherein the clone alert message indicates that the network device identity has been cloned.

23. The one or more tangible computer readable storage media of claim 21, wherein the logic that is operable to store comprises logic that is operable to store in association with a particular identifier of a network device an indication that evaluation of the particular identifier is to be performed with respect to particular criteria when a registration request message is received for the particular identifier together with data describing the particular criteria, and further comprising logic operable to generate data indicating that a network device is a clone when the evaluating logic determines that a registration request message for the particular identifier does not satisfy the particular criteria.

24. The one or more tangible computer readable storage media of claim 21, wherein when the logic that is operable to evaluate comprises logic operable to determine that a registration request message is received for the first network device using an identifier that is the same as an identifier for the second network device that is already registered for service, further comprising logic operable to send a message to the first gateway device from which the registration request message is received for the first network device notifying the first gateway device that the first network device is a clone and to deny registration for service of the first network device.

25. The one or more tangible computer readable storage media of claim 21, and further comprising logic operable to remove from the stored data a plurality of identifiers for network devices associated with a particular gateway device in response to receiving a message from the particular gateway device that it is shutting down.

26. The apparatus of claim 16, wherein the controller is further configured to store in association with a particular identifier of a network device data indicating that registration processing is to be based on specific criteria when a registration request message is received that contains the particular identifier, identify any gateway device that has registered a network device with the particular identifier, and send a re-register request message to any gateway device that has registered a network device with the particular identifier.

27. The apparatus of claim 16, wherein the controller is further configured to remove from the stored data a plurality of identifiers for network devices associated with a particular gateway device in response to receiving a message from the particular gateway device that it is shutting down.

28. The apparatus of claim 16, wherein the controller is further configured to receive a message from the second gateway device indicating that the second network device is not active, and to update the stored data at the control server to indicate that the first network device is the same as the second network device and that it has moved and is now registered through the first gateway device.

* * * * *